(12) United States Patent
Ephraim et al.

(10) Patent No.: US 12,022,845 B2
(45) Date of Patent: Jul. 2, 2024

(54) COFFEE DEGASSING METHOD

(71) Applicant: Modern Process Equipment, Inc., Chicago, IL (US)

(72) Inventors: Daniel Ephraim, Wilmette, IL (US); Sam Lepper, Chicago, IL (US); Brian Willebrand, Chicago, IL (US)

(73) Assignee: Modern Process Equipment, Inc., Chicago, IL (US)

( * ) Notice: Subject to any disclaimer, the term of this patent is extended or adjusted under 35 U.S.C. 154(b) by 464 days.

(21) Appl. No.: 17/314,282

(22) Filed: May 7, 2021

(65) Prior Publication Data
US 2021/0259270 A1  Aug. 26, 2021

Related U.S. Application Data

(62) Division of application No. 15/938,919, filed on Mar. 28, 2018, now Pat. No. 11,000,047.

(60) Provisional application No. 62/529,773, filed on Jul. 7, 2017.

(51) Int. Cl.
*A23F 5/04* (2006.01)
*A23F 5/10* (2006.01)
*A23F 5/16* (2006.01)

(52) U.S. Cl.
CPC ............... *A23F 5/04* (2013.01); *A23F 5/105* (2013.01); *A23F 5/16* (2013.01); *A23V 2002/00* (2013.01)

(58) Field of Classification Search
CPC .... A23F 5/10; A23F 5/105; A23F 5/00; A23F 5/16; A23F 5/166; A23F 5/04; A47J 42/38
See application file for complete search history.

(56) References Cited

U.S. PATENT DOCUMENTS

| | | | |
|---|---|---|---|
| 3,613,549 A * | 10/1971 | Champion | B65B 25/001 99/472 |
| 4,362,095 A | 12/1982 | Wheatley | |
| 5,222,364 A | 6/1993 | Carns et al. | |
| 6,260,479 B1 | 7/2001 | Friedrich | |
| 8,679,561 B2 | 3/2014 | Ludwig | |
| 2009/0304886 A1 | 12/2009 | Greenfield | |

* cited by examiner

*Primary Examiner* — Hong T Yoo
(74) *Attorney, Agent, or Firm* — Erickson Law Group, PC (57) ABSTRACT

A coffee degassing method is disclosed. A diffusion gas is supplied into a degassing tree in an bin containing roasted coffee. The degassing tree is in the roasted coffee. Carbon dioxide is diffused from the coffee with the diffusion gas. Carbon dioxide and the diffusion gas are exhausted from the bin. Another method of coffee degassing is disclosed. A diffusion gas is supplied into a degassing chamber in a bin containing roasted coffee. The degassing chamber is in the roasted coffee. Carbon dioxide is diffused from the coffee with the diffusion gas. Carbon dioxide and the nitrogen are exhausted from the bin.

23 Claims, 5 Drawing Sheets

COFFEE DEGASSING METHOD

This application is a divisional of U.S. patent application Ser. No. 15/938,919, filed Mar. 28, 2018, which claimed the benefit of U.S. Patent Application No. 62/529,773, filed Jul. 7, 2017. U.S. patent application Ser. No. 15/938,919, filed Mar. 28, 2018, is hereby incorporated by reference in its entirety.

FIELD OF THE INVENTION

The present invention relates to a coffee degassing device and method.

BACKGROUND OF THE INVENTION

After coffee is roasted, the roasted coffee will release carbon dioxide ($CO_2$). Some of the carbon dioxide in the coffee is released during roasting. Some of the carbon dioxide in the coffee is released during grinding after roasting. Further some carbon dioxide in coffee is release after grinding, in some cases, over about a 4 to 8 day period, depending on coffee origin, roast color, and grind.

In as much as this carbon dioxide will cause impermeable pouches, cans, and other containers to "blow up," the coffee manufacturing process needs to account for off-gassing of carbon dioxide. Previously, provision for off-gassing has included holding coffee in silos or other storage vessels for a period of time ranging from 6 to 96 hours depending on the variables mentioned above as well as the type of packaging container being utilized. But, the present inventor has recognized that waiting up to 96 hours for off-gassing to complete in order to package coffee delays shipment of coffee and increases costs.

Some of the methodologies for eliminating the degree of hold time for off-gassing have included vacuum packing of can coffee and the use of expensive one-way valves in both can coffee as well as packages and pouches. Yet, in some applications, such as brick pack containers and capsules, the use of one-way valves is not possible. The present inventors recognized the need for a device and method for improved and accelerated coffee degassing. The present inventors recognized the need for a conduit within a coffee holding area of a coffee bin to accelerate the degassing and exhausting of carbon dioxide from coffee. The present inventors recognized the desirability of using a diffusion gas to accelerate coffee degassing with no or minimal effect on the valuable taste and aromatics of the coffee.

SUMMARY OF THE INVENTION

A method of coffee degassing is disclosed. Diffusion gas is supplied into a degassing tree in an enclosed bin containing roasted coffee. The degassing tree is at least partially embedded in the roasted coffee. Carbon dioxide is diffused from the coffee with the diffusion gas. Carbon dioxide and the diffusion gas are exhausted from the bin.

Another method of coffee degassing is disclosed. Diffusion gas is supplied into a degassing chamber in an enclosed bin containing roasted coffee. The degassing chamber is at least partially embedded in the roasted coffee. Carbon dioxide is diffused from the coffee with the diffusion gas. Carbon dioxide and the diffusion gas are exhausted from the bin.

A further method of coffee degassing is disclosed. Coffee is provided in a coffee bin. The coffee bin comprises a conduit in the coffee holding area of the bin. The conduit comprises at least one opening in communication with the surrounding coffee in the coffee bin. The conduit provides an exit path for carbon dioxide off-gassing from the coffee to exit through on a passive basis without a diffusion gas necessarily being used or circulated.

Numerous other advantages and features of the present invention will become readily apparent from the following detailed description of the invention and the embodiments thereof, from the claims, and from the accompanying drawings.

DETAILED DESCRIPTION OF THE EMBODIMENTS

The following description is presented to enable any person skilled in the art to make and use the invention. For the purposes of explanation, specific nomenclature is used provides a plural understanding of the present invention. While this invention is susceptible of embodiment in many different forms, the drawings and this description demonstrate specific embodiments of the invention with the understanding that the present disclosure is to be considered as an exemplification of the principles of the invention and is not intended to limit the invention to the specific embodiments illustrated.

Figure 1:
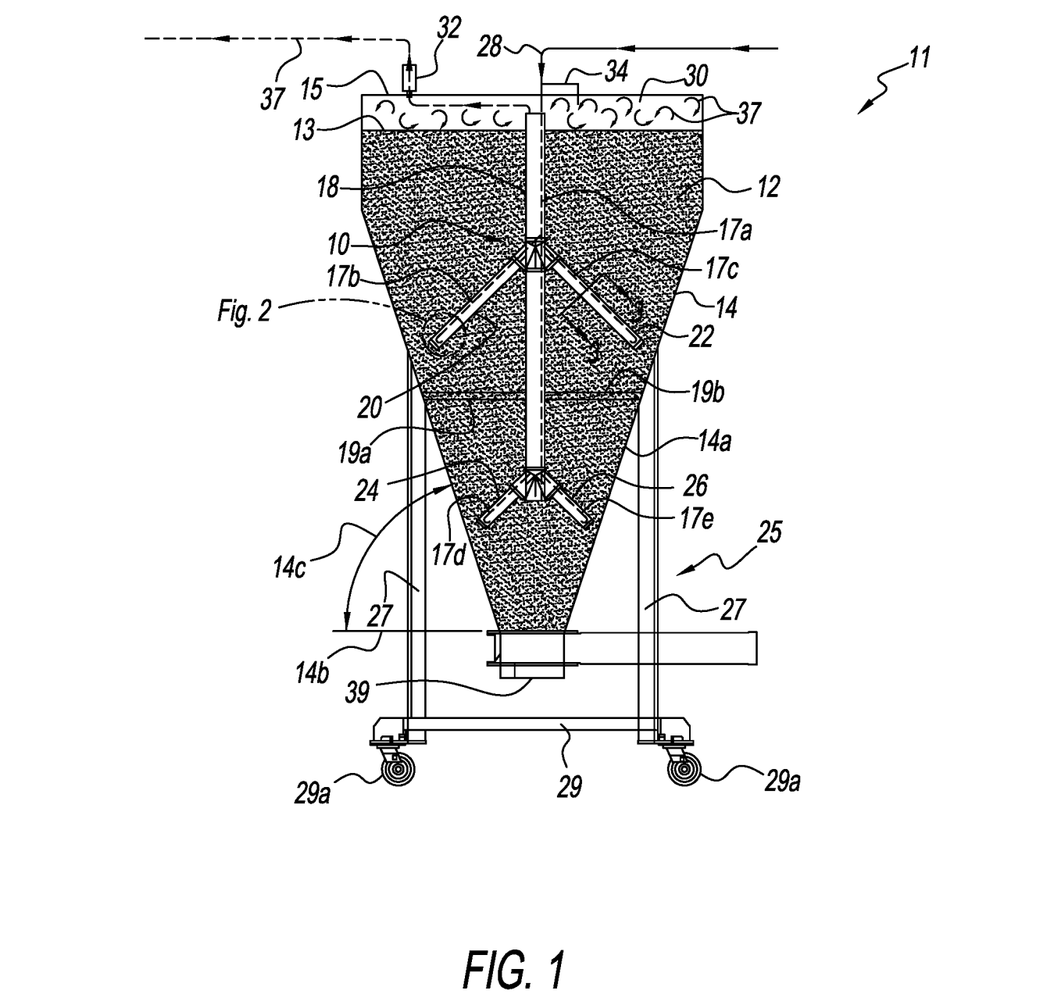
FIG. 1 is a front view of a coffee degassing device of one embodiment of the invention, the coffee bin of the coffee degassing device is shown in a front section view.

A first embodiment degassing device 11 is shown in FIG. 1. The degassing device comprises a degassing tree 10 and a container or bin 14. The bin 14 can hold or store coffee, such as ground coffee 12.

Figure 3:
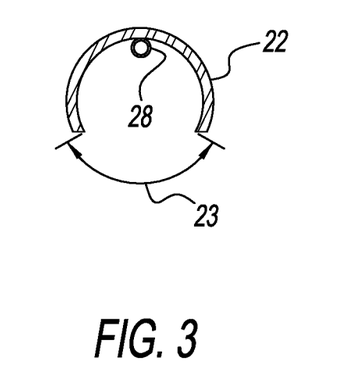
FIG. 3 is a section view of a branch of the degassing tree of FIG. 1 taken along line 3-3 of FIG. 1.

The degassing tree 10 comprises a trunk 18 and four branches 20, 22, 24, and 26. The trunk is a hollow conduit or tube. The trunk 18 extends vertically in the bin. The branches 20, 22, 24, and 26 are hollow conduits or tubes with a portion 23 of the side wall of the tubes removed as shown in FIG. 3. The branches each may comprise open ends, such as end 33 that are exposed to adjacent coffee inside the bin. While FIG. 3 shows a cross-section of branch 22, the cross-sections of branches 20, 24, and 26 are the same as is shown in FIG. 3. In some embodiments, the removed portion 23 is 120 degrees of the tube. In some embodiments, the trunk has a portion of the side wall removed in the same manner as shown in FIG. 3. The removed portion on the trunk may be on any side of the trunk. In some embodiments, the trunk does not have a portion of its sidewall removed.

A supply conduit or tube 28 extends through the tree 10, including in the trunk 18 and the four branches 20, 22, 24, and 26. The supply tube 28 supplies a diffusion gas, such as nitrogen.

The supply tube 28 may comprise a trunk supply tube 17a extending through the trunk 18 and four branch supply tubes 17b, 17c, 17d, 17e, extending from the trunk supply tube through the corresponding branches 20, 22, 24, 26. The removed portion 23 of branches 20, 22, 24, 26 is opposite the supply tube 28. The supply tube 28 may be located at the top of the branches and the removed portion 23 may be located at the bottom.

Figure 2:
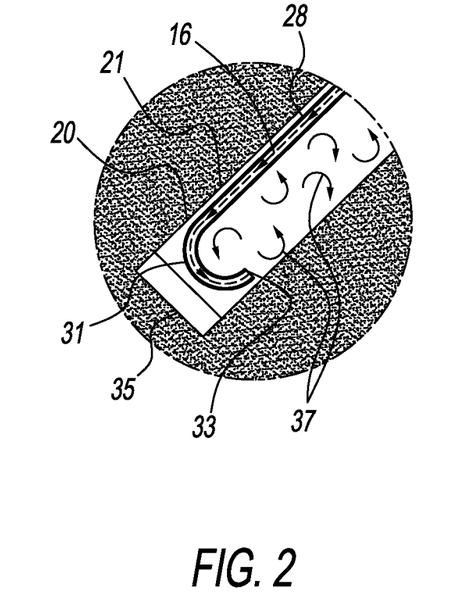
FIG. 2 is a front sectional view of a branch of the degassing tree of the degassing device of FIG. 1.

FIG. 2 shows a side section view of an end portion 21 of branch 20. The supply tube 28 has a curved end portion 31. An end 33 of the supply tube 28 is open internal to the branch 20 and opposite an end 35 of the branch. This encourages the flow of nitrogen and entrained carbon dioxide 37 up the branch and up the trunk 18 to the headspace 30. The nitrogen and carbon dioxide can exit the bin, such as through the one-way valve 32.

The tree 10 can be supported within the bin 14 by one or more frame members 19a, 19b extending from the bin to the tree. The frame members may join with the trunk and/or the branches to support the tree within the bin. In some embodiments the frame member(s) may extend from a top of the bin and support the tree from the top of the bin. In some embodiments the frame member(s) may extend from a bottom of the bin.

In other embodiments, more or less branches may be used and the branches may be provided at different angles from the trunk than is shown in the figures. For example, one, two, three, four, or more branches may be used. While the trunk and branches are shown as a hollow tube with a rounded cross-section, other cross-sectional shaped tubes are possible, such as quadrilateral, square, rectangle, triangle, etc.

At least two modes of accelerated degassing of coffee are disclosed. The first mode is a passive mode. The existence of the tree 10, 84, and/or conduit 42 and degassing chamber 44, as a conduit within the bed of coffee provides a path for carbon dioxide to exit the coffee without the friction of migrating through a bed of coffee without a conduit. The existence of an open path within the bed of coffee provides a passive basis for carbon dioxide to degas and exit the coffee even if nitrogen is not flown through the tree or degassing chamber 44. The second mode is an active mode. In the active mode, a diffusion gas, such as nitrogen, is flown in or through the tree 10, 84, conduit 42, and/or a degassing chamber 44, to achieve accelerated degassing, as is more fully explained below.

In some embodiments, a method of degassing of carbon dioxide utilizes the degassing tree 10 to expose the coffee 12 throughout the bin 14 to the diffusion properties of nitrogen 16, as shown in FIG. 1. The flow of nitrogen does not pass through the bed of coffee 12, but rather is used as a diffusive agent at the locations where the degassing tree 10 is located within the bed of coffee 12. Carbon dioxide degassing from the coffee will equalize through diffusion through a bed of coffee. An end result of equalization is equilibrium where the carbon dioxide is no longer or substantially no longer diffusing from the coffee. The diffusion gas, such as nitrogen, is a means of diffusion of the carbon dioxide via desorption. During desorption, the degassing tree 10 and the headspace 30 will comprise a combination of the nitrogen and carbon dioxide 37.

Another method of degassing utilizes the head space 30. The headspace 30 is the area between the top 13 of the bed of coffee 12 within the coffee bin 14 and the top 15 of the bin. The headspace 30 can be used for passive diffusion utilizing nitrogen. The carbon dioxide laden nitrogen 37 being exhausted to the outside of the bin, for example through a one-way valve 32. The head space degassing can be used in combination with the degassing tree or without the degassing tree.

Although there can be a variety of combinations, the nitrogen entering the tapered or non-tapered degassing tree branches at their further-most points, such as the ends 33 of the tube 28 at or adjacent the ends of the branches, will quickly rise through the branches and the trunk 18 of the tree 10, drawing carbon dioxide with it, to the headspace 30 above, at which point the nitrogen will circulate and further diffuse the carbon dioxide, after which it will exit the bin, for example through a one-way valve 32. In some embodiments, the nitrogen may be continuously supplied at a predetermined rate into the degassing tree. In some embodiments, the nitrogen may be suppled at intermittent intervals.

In addition to the diffusion effects of the diffusion gas, such as nitrogen, the replacement of resident carbon dioxide off-gasses with the nitrogen in the headspace 30 of the bin 14 is helpful in degassing inasmuch as carbon diox, e has a very low coefficient of diffusion and otherwise inhibits the degassing of the coffee.

In some embodiments, a headspace branch line/conduit 34 extends off the tube 28. Therefore nitrogen can be provided directly to the headspace. The branching off of line 34 from tube 28 occurs outside of the bin in FIG. 1, but it could also occur at a location inside the bin. Further, in some embodiments, the branch line 34 is not a branch off of tube 28 but is a separate line from tube 28. Still further, in some embodiments, the branch 34 could enter the headspace from a side of the bin rather than the top.

Figure 4:
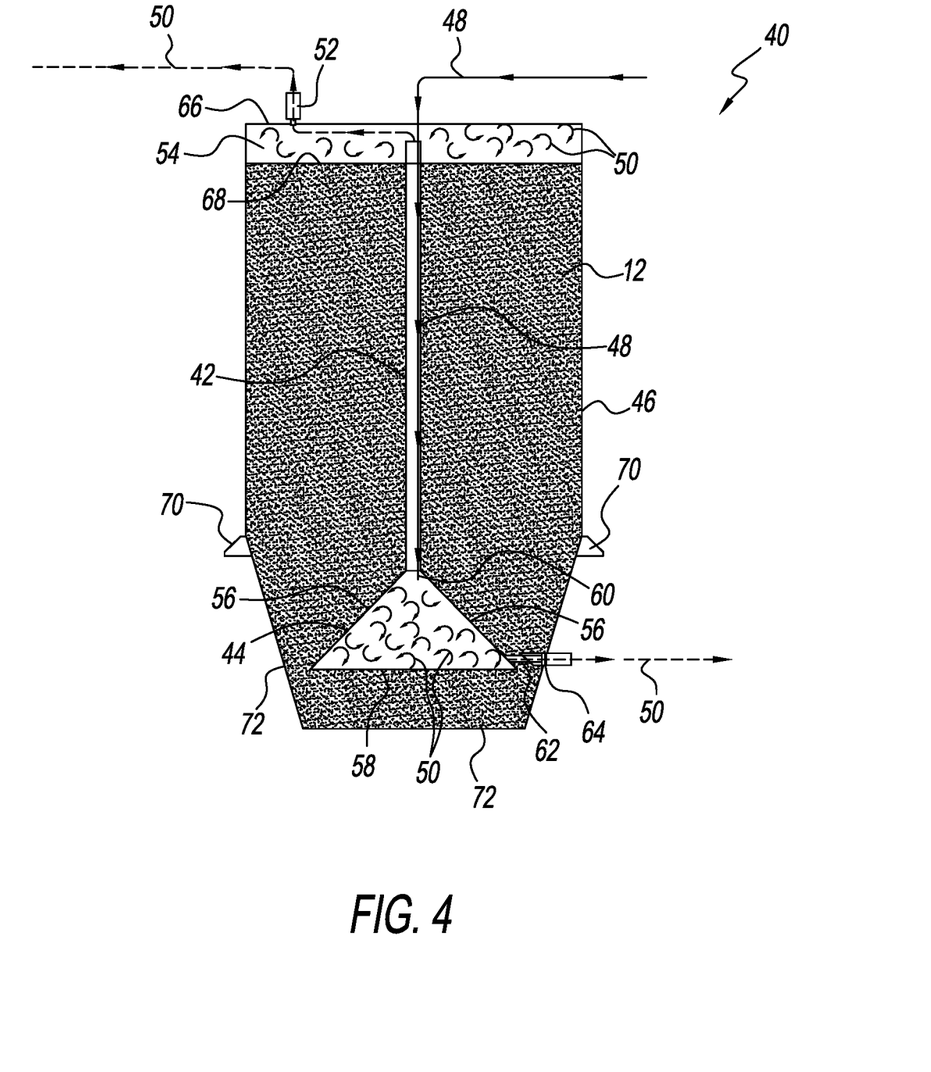
FIG. 4 is a front sectional view of a second embodiment coffee degassing device.

A second embodiment degassing device 40 is shown in FIG. 4. The degassing device 40 comprises a main conduit 42, degassing chamber 44, and a bin 46. The bin 46 can hold or store coffee, such as ground coffee 12. In some embodiments, the main conduit 42 extend vertically to the degassing chamber 44 as shown in FIG. 4. The degassing chamber 44 has an open bottom side 58. In some embodiments the bottom side is completely open and in some embodiments the bottom side is partially open. The open bottom side 58 allows carbon dioxide off gassing from the coffee to enter the chamber and to interact with the nitrogen supplied in the chamber.

A diffusion gas supply conduit or tube 48 extends through the conduit 42 into the degassing chamber 44 for supplying the nitrogen. The supply tube 48 may extend from an external source outside of the bin. The supply tube 48 may have the same cross sectional shape as tube 28. The supply tube may be located at or adjacent a side of the conduit 42, as shown in FIG. 4. The supply tube 48 is shown at an interior right side of the conduit, but it may be located anywhere within the conduit 42. The conduit 42, like the trunk 18, and branches 20, 22, 24, 26 of tree 10, is larger than the supply tube 48, so as to allow a return/exhaust path for the nitrogen and carbon dioxide 50 to reach the headspace 54 and to exit an upper end of the bin, such as through an upper one-way valve 52. A bottom end 60 of the tube 48 is open to allow the nitrogen to enter the degassing chamber 44. The head space 54 is located between the top 68 of the coffee 12 and the top wall 66 of the bin 46.

In some embodiments, the degassing chamber 44 is defined by a conical wall 56 forming a cone. The conduit 42 joins the cone at a top end. The cone has the open bottom side 58. The open bottom side 58 allows exposure of the adjacent coffee to the degassing chamber 44 and to the nitrogen supplied into the degassing chamber by the tube 48. While the degassing chamber is shown in a conical form, other shapes are possible such as a cube, box, pyramid, sphere, ellipse, cylinder, irregular shape or other single or multi-sided shape defining a three dimensional space comprising at least a partially open bottom. In some embodiments, for example, if the side walls of the chamber are vertical, the side walls could be open or partially open.

In some embodiments, a lower exhaust path 62 is provided from the bin 46. The path may be in the form of a tube or other conduit. A lower one-way valve 64 allows the nitrogen and carbon dioxide 50 to exit the bin but prevents air or exterior gas from entering into the degassing chamber. In some embodiments, the exit path 62 may be perpendicular to the vertical conduit 42.

The degassing chamber 44 is shown in the lower quarter of the bin 46 in FIG. 4. Since carbon dioxide is a heavy gas it tends to fall to the bottom of the bin. Therefore, having the degassing chamber in a lower portion of the bin is beneficial in accelerating the carbon dioxide degassing and therein and exhausting therefrom. However, in some embodiments the degassing chamber can be located in the lower third of the bin or the lower half of the bin. In some embodiments, the degassing chamber is located in an upper portion of the bin, such as the upper half of the bin or the upper fourth of the bin. The degassing chamber can be located in any portion of the coffee bin.

The conduit 42 and the degassing chamber 44 can be supported within the bin 46 by one or more frame members (not shown) extending from the bin to the conduit 42 and/or the chamber 44.

In some embodiments, a method of degassing of carbon dioxide utilizes the degassing chamber 44 to expose the coffee 12 in the bin 46 to the diffusion properties of the nitrogen 16, as shown in FIG. 4. The flow of nitrogen does not pass through the bed of coffee 12, but rather is used as a diffusive agent at the location where the degassing chamber 44 is located within the bed of coffee 12. Carbon dioxide degassing from the coffee will equalize through diffusion through a bed of coffee. An end result of equalization is equilibrium where the carbon dioxide is no longer or substantially no longer diffusing from the coffee. The nitrogen is a means of diffusion of the carbon dioxide via desorption. During desorption, the conduit 42, the degassing chamber 44, and the headspace 30 will comprise a combination of the nitrogen and carbon dioxide 50. The combination of nitrogen and carbon dioxide 50 can exit through valves 52 or 64.

Another method of degassing utilizes the head space 54. The area between the top 66 of the bed of coffee 12 within the coffee bin 46 and the top 68 of the bin, or headspace 54, can be used for passive diffusion utilizing the nitrogen. The carbon dioxide laden nitrogen 50 being exhausted to the outside of the bin, for example through a one-way valve 52.

Figure 5:
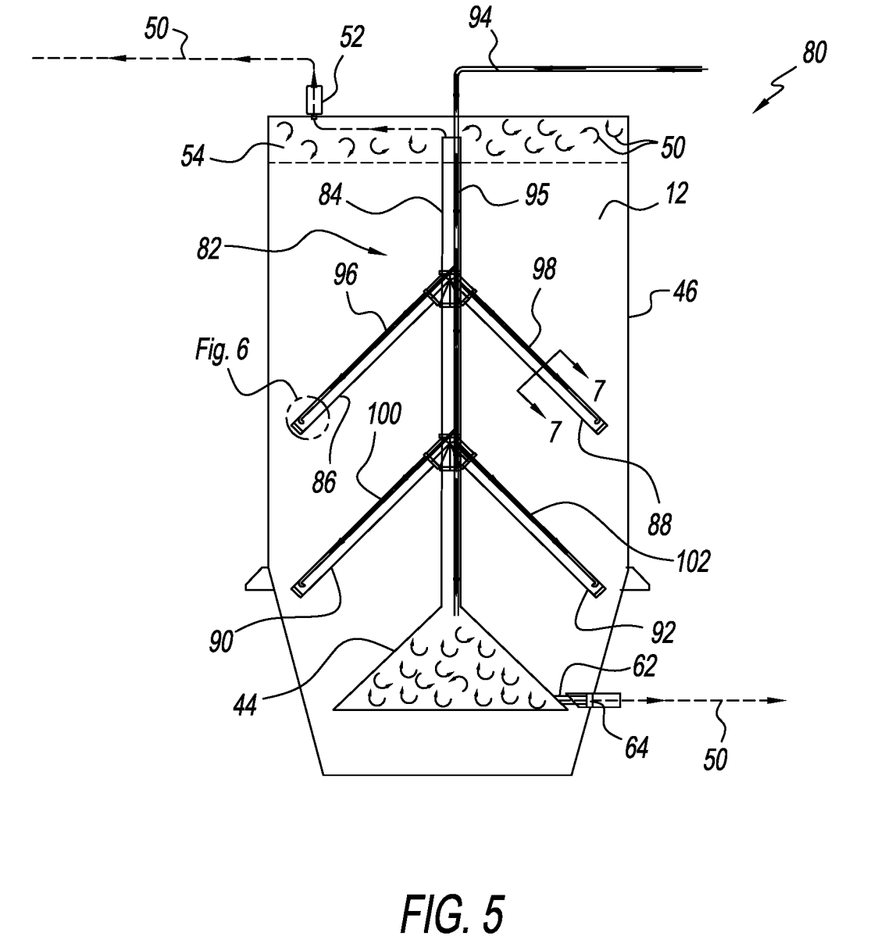
FIG. 5 is a front sectional view of a third embodiment coffee degassing device.
Figure 6:
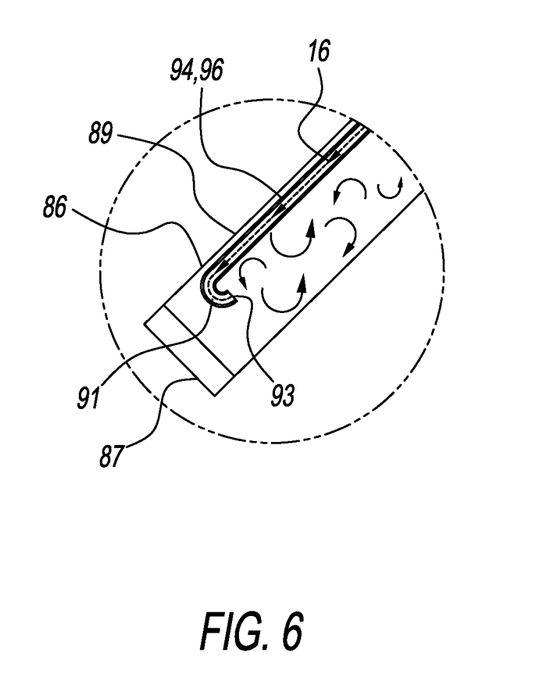
FIG. 6 is a front sectional view of a branch of the degassing device of FIG. 5.
Figure 7:
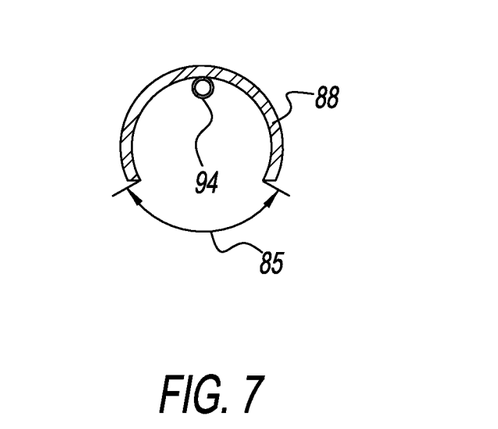
FIG. 7 is a section view of a branch of the degassing tree of FIG. 5 taken along line 7-7 of FIG. 5.

A third embodiment degassing device 80 is shown in FIGS. 5 through 7. The degassing device 80 comprises the degassing chamber 44 and the bin 46 of device 40, but comprises a degassing tree 82 similar to tree 10 of device 11. Therefore the degassing tree 82 and degassing chamber 44 can be combined. The bin 46 can hold or store coffee, such as ground coffee 12.

The degassing tree 82 comprises a trunk 84 and four branches 86, 88, 90, 92. The trunk is a hollow conduit or tube. The trunk 84 connects to the degassing chamber 44 and is in communication with the chamber 44. The branches 86, 88, 90, 92 are hollow conduit or tubes with a portion 85 of the side wall of the tubes removed as shown in FIG. 7. The branches each may comprise open ends, such as end 87 that are exposed to coffee inside the bin. While FIG. 7 shows a cross-section of branch 88, the cross-sections of tubes 86, 88, 90, 92 are the same as shown in FIG. 7.

A diffusion gas supply conduit or tube 94 extends through the tree 82, including in the trunk 84 and the four branches 86, 88, 90, and 92 for supplying the diffusion gas, such as nitrogen. Therefore, the supply tube 94 may comprise a trunk supply tube 95 extending through the trunk and four branch supply tubes, 96, 98, 100, 102 extending from the trunk supply tube through the corresponding branches 86, 88, 90, 92. The removed portion 85 is opposite the supply tube 94. The supply tube 94 may be located at the top of the branches and the removed portion 85 may be located at the bottom.

FIG. 6 shows a side section view of an end portion 89 of branch 86. The supply tube 94 has a curved end portion 91. An end 93 of the supply tube 94 is open internal to the branch 86 and opposite an end 87 of the branch. This encourages the flow of the nitrogen up the branch and up the trunk 84 to the headspace 54. The curved end portion 91 has a greater radius of curvature than does end portion 31, so that the end 93 is located closer to the top of the branch 86 than is the end 33 in branch 20.

In some embodiments, a method of degassing of carbon dioxide utilizes the tree 82 and degassing chamber 44 to expose the coffee 12 in the bin 46 to the diffusion properties of nitrogen. That is, the flow of nitrogen does not pass through the bed of coffee 12, but rather is used as a diffusive agent at locations where the degassing tree 82 and degassing chamber 44 are located within the bed of coffee 12. During desorption, the tree 82, degassing chamber 44, and the headspace 30 will comprise a combination of the nitrogen and carbon dioxide 50.

In some embodiments, the operator or a computer control can select among operating modes: headspace only mode where the nitrogen is flown to the headspace and not directly into the tree 10, 84; tree mode, where the nitrogen is flown into the tree only and not directly into the headspace; and dual mode, where the nitrogen is flown directly into the headspace and into the tree at the same time. One or more valves can be used on tube 28 and or 34 to control whether the nitrogen is allowed to flow through tubes 28 or 34 and into the respective tree and/or headspace. In some embodiments, the device can be configured to provide only one of the operating modes. Regarding the second coffee degassing device 40, the operator or a computer control can select among operating modes: headspace only mode where the nitrogen is flown to the headspace and not directly into the conduit 42 and degassing chamber 44; chamber mode, where the nitrogen is flown into the degassing chamber and not directly into the headspace; and dual mode, where the nitrogen is flown directly into the degassing chamber and headspace at the same time. Regarding the third embodiment coffee degassing device 80, the operator or a computer control can select among operating modes: headspace only mode where the nitrogen is flown to the headspace and not directly into the tree 82 and degassing chamber 44; tree/chamber mode, where the nitrogen is flown into the tree and degassing chamber and not directly into the headspace; and dual mode, where the nitrogen is flown directly into the tree, degassing chamber, and headspace at the same time.

The bins 14, 46 each comprise a top opening (not shown) for receiving coffee. The top opening can be sealingly closed by a door (not shown). The bin 14, 46 may each comprise a lower coffee exit 39 (not shown for bin 46). The lower coffee exit may be sealingly closable by a lower door (not shown). While two types of coffee bins 14 and 46 are shown, other shaped and types of containers or bins for holding coffee can be used. The coffee bins, when closed, can seal the coffee bin from exposure to exterior air, oxygen, and contaminants. The bins may be supported on a stand, such as stand 25.

The stand may comprise legs 27 that connect to the bin, one or more cross-members 29 connecting the legs 27, and optional wheels 29a. Bin 46 comprises mounting arms 70, which may be used for mounting to a stand. As shown in the drawings, the bins may comprise a tapered or conical bottom portion 14a, 72. In some embodiments, the side wall of the tapered portion 14a is angled 14c seventy two degrees from a horizontal plane 14b of the exit end.

As explained above, in some embodiments, the degassing tree 10, 82, conduit 42, and/or the degassing chamber 44 can be used passively. When the degassing tree or degassing chamber is used passively, no means of diffusion is flown into the degassing tree or degassing chamber, instead the carbon dioxide off gasses and escapes through the degassing tree 10, 82, conduit 42 and/or degassing chamber 44, without a flown or injected means of diffusions, and out of the bin, such as through one or more one-way valve.

In some embodiments, other diffusion gases, such as other chemicals, elements, or compounds, can be used as means of diffusion in place of nitrogen or in addition to nitrogen. In some embodiments, other diffusion gases are usable that have a positive coefficient of diffusion that assist in the degassing, desorption, and/or equalizing of the carbon dioxide degassing from coffee. In some embodiments, the other diffusion gases include inert gases, such as argon. In some applications where nitrogen is used in may be in the form of dinitrogen ($N_2$).

In some embodiments, air might be used as a means of diffusion in place of nitrogen if the user accepts the effects that air might have on the coffee taste and aromatics.

From the foregoing, it will be observed that numerous variations and modifications may be effected without departing from the spirit and scope of the invention. It is to be understood that no limitation with respect to the specific apparatus illustrated herein is intended or should be inferred. For example, one or more component or embodiments may be combined, modified, removed, or supplemented to form further embodiments within the scope of the invention. As a further example, steps provided could be carried out in a different order to achieve desired results. Further, steps could be added or removed from the processes described. Therefore, other embodiments and implementations are within the scope of the invention.

The invention claimed is:

1. A coffee degassing method, comprising the steps of:
flowing a diffusion gas into an at least one branch of a degassing tree in a coffee bin containing a roasted coffee to diffuse a carbon dioxide from the roasted coffee and move the carbon dioxide and the diffusion gas through the at least one branch and a trunk of the degassing tree toward a top end of the bin, where the at least one branch is in the roasted coffee and the branch is open to the roasted coffee, the at least one branch is connected to the trunk and extends from an exterior of the trunk; and,
exhausting the carbon dioxide and the diffusion gas from the bin.

2. The method of claim 1, wherein the step of flowing comprises the step of flowing the carbon dioxide and the diffusion gas out of the trunk and into the top end of the bin, wherein the trunk opens to the top end of the bin.

3. The method of claim 2, wherein the step of exhausting comprises releasing the carbon dioxide and the diffusion gas from the bin through a one-way valve at the top end of the bin.

4. The method of claim 2, wherein the step of exhausting is further defined in that the flowing the diffusion gas into the at least one branch forces the carbon dioxide and the diffusion gas out of the bin.

5. The method of claim 1, wherein the step of flowing comprises the step of flowing the carbon dioxide and the diffusion gas out of the trunk and into a headspace of the bin between a top of the roasted coffee and a top of the bin, wherein the trunk opens into the headspace; and the step of exhausting comprises releasing the carbon dioxide and the diffusion gas From the headspace through a one-way valve at the top end of the bin.

6. The method of claim 1, wherein the at least one branch is a plurality of branches, and wherein the step of flowing comprises the step of flowing the diffusion gas into the plurality of branches to move the carbon dioxide and the diffusion gas through the plurality of branches into and up the trunk of the degassing tree toward the top end of the bin.

7. The method of claim 1, further comprising a step of diffusing in a headspace of the bin, the carbon dioxide from the roasted coffee in the bin, where the headspace is between a top of the roasted coffee and a top of the bin.

8. The method of claim 1, wherein the step of flowing is further defined in that the diffusion gas is nitrogen.

9. The method of claim 1, wherein the step of flowing is further defined in that the diffusion gas is directed from a terminal end of the at least one branch toward the trunk.

10. The method of claim 1, comprising the step of
flowing the diffusion gas into a degassing chamber in the coffee bin to diffuse the carbon dioxide from the roasted coffee and moves the carbon dioxide and the diffusion gas through the trunk toward a top end of the bin, where the degassing chamber is connected to a bottom end of the trunk, and the degassing chamber is within the roasted coffee in the bin and comprises an at least partially open bottom side that is open to the roasted coffee in the bin.

11. The method of claim 10, wherein the step of flowing a diffusion gas into the degassing chamber is further defined in that the diffusion gas and the carbon dioxide in the degassing chamber are moved through a side exhaust conduit extending from the degassing chamber, and wherein the step of exhausting further comprises the step of exhausting the carbon dioxide and the diffusion gas in the side exhaust conduit out of the bin.

12. A coffee degassing method, comprising the steps of:
flowing a diffusion gas into a degassing chamber in a coffee bin containing roasted coffee to diffuse the carbon dioxide from the roasted coffee and move the carbon dioxide and the diffusion gas through a first conduit connected to the degassing chamber toward a top end of the bin, where the degassing chamber is within the roasted coffee in the bin and comprises an at least partially open bottom side that is open to the roasted coffee in the bin; and,
exhausting the carbon dioxide and the diffusion gas from the bin.

13. The method of claim 12, wherein the step of flowing comprises the step of flowing the carbon dioxide and the diffusion gas out of the first conduit and into the top end of the bin, wherein the first conduit opens to the top end of the bin.

14. The method of claim 13, wherein the step of exhausting comprises releasing the carbon dioxide and the diffusion gas from the bin through a one-way valve at the top end of the bin.

15. The method of claim 12, wherein the step of flowing comprises the step of flowing the carbon dioxide and the diffusion gas out of the first conduit and into a headspace of the bin between a top of the roasted coffee and a top of the bin, wherein the first conduit opens into the headspace.

16. The method of claim 15, wherein the step of exhausting comprises releasing the carbon dioxide and the diffusion gas from the bin through a one-way valve in communication with the headspace.

17. The method of claim 12, further comprising the step of diffusing a carbon dioxide in a headspace between a top of the roasted coffee and a top of the bin.

18. The method of claim 12, wherein the step of flowing is further defined in that the diffusion gas is nitrogen.

19. The method of claim 12, further comprising the step of flowing the carbon dioxide and the diffusion gas through a side exhaust conduit extending from the degassing chamber, and wherein the step of exhausting further comprise the steps of exhausting the carbon dioxide and the diffusion gas from the side exhaust conduit out of the bin.

20. A coffee degassing method, comprising the steps of:
diffusing a carbon dioxide from a roasted coffee in a coffee bin with a diffusion gas supplied in an at least one branch of a degassing tree in the coffee bin, where the at least one branch is in the roasted coffee and the at least one branch is open to the roasted coffee;
moving the carbon dioxide and the diffusion gas through the at least one branch and through a trunk of the degassing tree toward a top end of the bin, the at least one branch is connected to the trunk and extends from an exterior of the trunk; and,
exhausting the carbon dioxide and the diffusion gas from the bin.

21. The method of claim 20, wherein the steps of diffusing and moving are each further defined in that the diffusion gas is flown in the at least one branch to diffuse the carbon dioxide from the roasted coffee and to move the carbon dioxide and the diffusion gas through the at least one branch and through the trunk of the degassing tree toward the top end of the bin.

22. A coffee degassing method, comprising the steps of:
diffusing a carbon dioxide from a roasted coffee in a coffee bin with a diffusion gas supplied in a degassing chamber in the coffee bin, where the degassing chamber is within the roasted coffee in the bin and comprises an at least partially open bottom side that is open to the roasted coffee in the bin;
moving the carbon dioxide and the diffusion gas from the degassing chamber into a first conduit toward a top end of the bin, the first conduit is connected to the degassing chamber; and,
exhausting the carbon dioxide and the diffusion gas from the bin.

23. The method of claim 22, wherein the steps of diffusing and moving are each further defined in that the diffusion gas is flown in the degassing chamber to diffuse the carbon dioxide from the roasted coffee and to move the carbon dioxide and the diffusion gas from the degassing chamber through the first conduit toward the top end of the bin.

* * * * *